United States Patent [19]

Breu

[11] Patent Number: 5,023,920
[45] Date of Patent: Jun. 11, 1991

[54] METHOD FOR FINDING THE MEDIAL AXIS TRANSFORM OF AN IMAGE

[75] Inventor: Heinz Breu, Mountain View, Calif.

[73] Assignee: Hewlett-Packard Company, Palo Alto, Calif.

[21] Appl. No.: 400,211

[22] Filed: Aug. 28, 1989

[51] Int. Cl.$^5$ .............................................. G06K 9/36
[52] U.S. Cl. ........................................ 382/55; 382/60
[58] Field of Search ............................. 382/60, 55, 54

[56] References Cited

PUBLICATIONS

F. Pasian and C. Vuerli, "Core-Line Tracing for Fuzzy Image Subsets", Patterson Recognition Letters 4, pp. 93–98, 1986.
Rosenfeld and Kak, *Digital Picture Processing*, Academic Press, 1982, pp. 194, 195, 211–217.
T. Wakayama, "A Core-Line Tracing Algorithm Based on Maximal Square Moving", IEEE Transactions on Pattern Analysis and Machines Intelligence, 4(1), pp. 68–74, 1982.
H. Blum, "A Transformation for Extracting New Descriptors of Shape", in W. Walthen–Dunn (ed.), *Models for the Perception of Speech and Visual Form*, M.I.T. Press, 1967, pp. 362–379.

*Primary Examiner*—Leo H. Boudreau
*Assistant Examiner*—David Fox

[57] ABSTRACT

An improved method for constructing the medial axis transform of an image is disclosed. The method requires only that one line of the image be held in memory at any given time. The method runs in a time of order N, where N is the number of pixels in the image.

4 Claims, 10 Drawing Sheets

|  | 1 | 2 | 3 | 4 | 5 | 6 | 7 | 8 | 9 |
|---|---|---|---|---|---|---|---|---|---|
| 1 | 1 | 1 | 1 | 1 | 1 | 1 | 1 | 1 | 1 |
| 2 | 1 | 1 | 1 | 1 | 1 | 1 | 1 | 0 | 1 |
| 3 | 1 | 1 | 1 | 1 | 1 | 1 | 1 | 1 | 1 |
| 4 | 1 | 1 | 0 | 1 | 1 | 1 | 1 | 1 | 1 |
| 5 | 1 | 1 | 1 | 1 | 1 | 1 | 1 | 1 | 1 |
| 6 | 1 | 1 | 1 | 1 | 0 | 1 | 1 | 1 | 1 |

COLUMN →
ROW ↓

METHOD FOR FINDING THE MEDIAL AXIS TRANSFORM OF AN IMAGE

The present invention relates to optical pattern recognition systems, and more particularly, to methods for performing medial axis transforms on a digital image.

A basic problem in pattern recognition is the classification of objects by the shapes thereof. Consider a line drawing of an object such as a letter of the alphabet. An optical character recognition system must be able to identify the letter independently of the width of the lines used to draw it. That is, an "R" should be recognized as such whether it is printed in normal print or in bold print. Simple template matching algorithms perform poorly when used to classify objects drawn with different width lines.

One method of reducing the complexity of classifying solid objects is to first reduce the solid object to a "stick" figure. For example, the stick figure representations of letters of the alphabet are independent of the widths of the lines used to draw the letters. Hence, a bold printed "R" and a normal printed "R" have substantially the same stick figure representation.

Transformations for extracting stick figures from images have been known to the pattern recognition arts for some time. For example, Blum ["A Transformation for Extracting New Descriptors of Shape" in Models for the Perception of Speech and Visual Form, M.I.T. Press, 1967] described a transformation for generating a stick figure in which the calculations were based on wave propagation from the various points in the image. This method is equivalent to finding the centers of all of the maximal disks in the image. A disk is a solid area having a circular boundary. A disk is maximal if it is not contained in any other disk. This method is often referred to as the medial axis transformation of the image.

Although the medial axis transform provides useful information in pattern recognition problems, the computational effort needed to extract the medial axis transform often makes the utilization of this method unattractive. If circular disks are used numerous distance calculations are needed which are quite time consuming on conventional digital computers. One solution to this problem is to define a disk in a different metric system. One wishes to chose a metric in which the distance calculations are particularly simple. The most convenient metric in this regard is the $L_\infty$ metric. In this metric, a disk is a solid square.

Medial axis transforms utilizing maximal squares are known to the prior art; hence, their properties will not be reviewed in detail here. For the purposes of this discussion, it will be sufficient to note that such transformed images have been found useful in classifying shapes.

In digital image processing, an image may be mapped onto a two dimensional array of pixels in which the value of a pixel is either 0 or 1. The specific mapping will depend on the image and any desired feature enhancement. For example, in a gray scale image in which each pixel has a value between 0 and 255, the corresponding pixels in the two dimensional array may be set by choosing a threshold value between 0 and 255. If a pixel in the original image is greater than the threshold value, the corresponding pixel in the two dimensional array is assigned a value of 1; otherwise the pixel is assigned a value of 0.

Both parallel and sequential methods for computing the medial axis transform of an image are presented in Rosenfield and Kak [Digital Picture Processing, Academic Press, 1982]. The sequential method first computes the distance transform of the image. That is, it computes a new array having the same size as an image. Each element of the new array is labeled with the distance of the corresponding pixel from the edge of the object. This may be accomplished in two passes through the image. The first pass goes through the image from left to right and from top to bottom. The second pass goes through the image from right to left and bottom to top. The medial axis transform corresponds to the local maxima in the distance transform. The extraction of the local maxima requires a third pass through the image. For an mxn pixel image, the method requires a time which is of the order of mn and computer storage which is also of the order of mn.

The parallel method for constructing the distance transform requires a time which is proportional to a number of the order of diameter of the figure. This method requires a parallel computer with nm processors. Since each processor requires an area of silicon which is substantially larger than the silicon area needed to store a pixel, the computer space needed is much greater than mn if the parallel method is employed.

An improved method for calculating a medial axis transform is also described by Wakayama ["A core-line Tracing Algorithm based on Maximal Square Moving", IEEE Transactions on Pattern Analysis and Machine Intelligence, 4(1), pp 68-74, 1982]. In this method, only a single scan of the images is needed. The method detects each square with an "exposed" upper left corner and derives other squares which are adjacent to it. Wakayama does not provide an analysis of the complexity of the method; however, Wakayama does mention that the method requires a working memory which is of the order of $L_0 n$, where $L_0$ is the length of the side of the largest square in the image, and n is the number of pixels in a row of the image. Hence, in the worse case, a working memory of the order of $n^2$ is needed (i.e., the largest square is essentially the same size as the image).

The amount of computer memory needed in the above described methods is a major drawback of these methods. Each of these methods requires an amount of memory of the order of that needed to store the entire image. Ideally, one would like a method which does not require that the entire image be stored during processing. This is particularly true in systems in which the image is being scanned by causing it to sweep over a linear array of photo-detectors. In this case, one would like a method which operated from a single scan line.

Accordingly it is an object of the present invention to provide an improved method for constructing the medial axis transform of an image.

It is another object of the present invention to provide a method that requires an amount of memory of the order of that needed to store a single scan line.

These and other objects of the present invention will be apparent to those skilled in the art from the following detailed description of the invention and the accompanying drawings.

SUMMARY OF THE INVENTION

The present invention consists of a method for finding maximal squares in a two-dimensional array of pixels. Each pixel in the array has a value of one or zero. The two-dimensional array comprises a plurality of sequentially numbered rows and a plurality of sequentially numbered columns. The method of the present invention includes the steps of examining a row of the two-dimensional array and constructing a list of all filled squares having bottoms on the row in question and for which the northwest, northeast, southwest and southeast squares are not filled squares.

DETAILED DESCRIPTION OF THE INVENTION

Figure 1A:
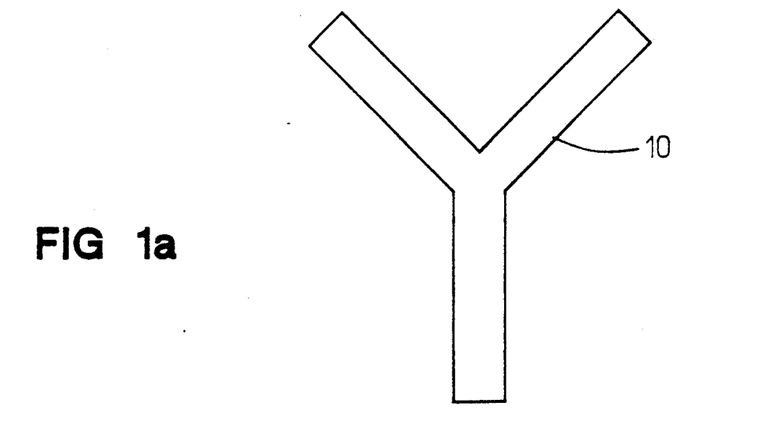
FIG. 1(a) illustrates a scanned image consisting of a capital Y.
Figure 1B:
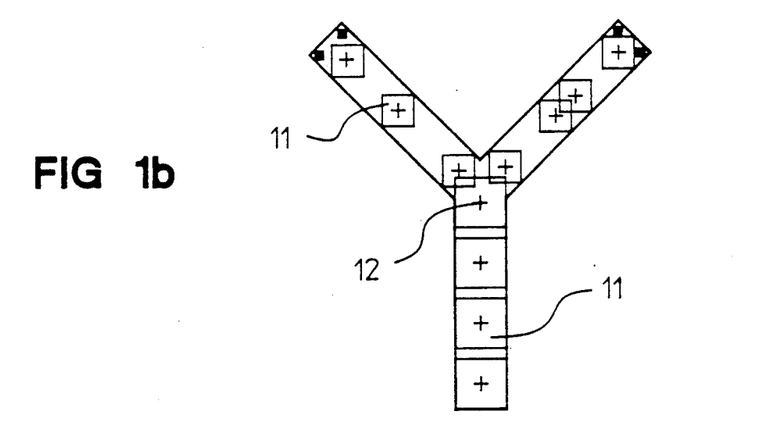
FIG. 1(b) illustrates the image shown in FIG. 1(a) with exemplary maximal squares superimposed thereon.
Figure 1C:
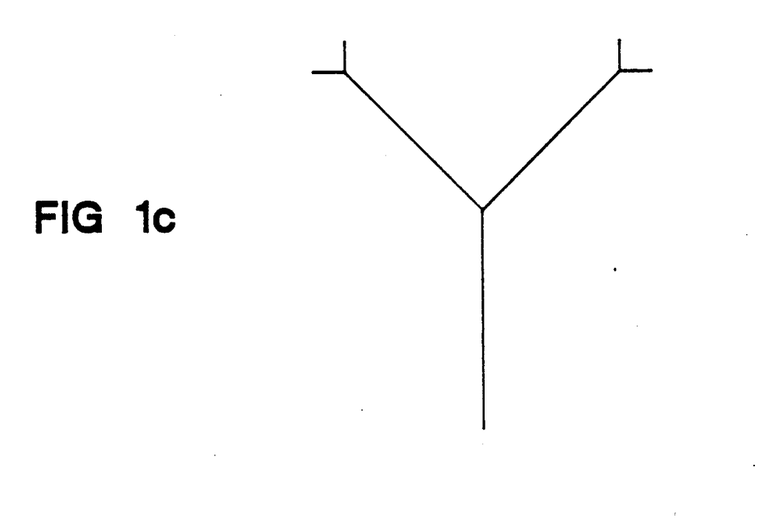
FIG. 1(c) illustrates the locus of the centers of all of the maximal squares in the image shown in FIG. 1(a).

The manner in which a medial axis transform is used to generate a stick figure from a scanned image is illustrated in FIGS. 1(a)-(c). FIG. 1(a) shows a scanned image 10 consisting of a capital Y. FIG. 1(b) shows the same image with exemplary maximal squares 11 superimposed thereon. The center of each square is indicated by a cross of which cross 12 is an example. The medial axis transform of image 10 is the locus of the centers of the maximal squares. FIG. 1(c) shows the locus of the centers of all of the maximal squares in question.

Figure 2:
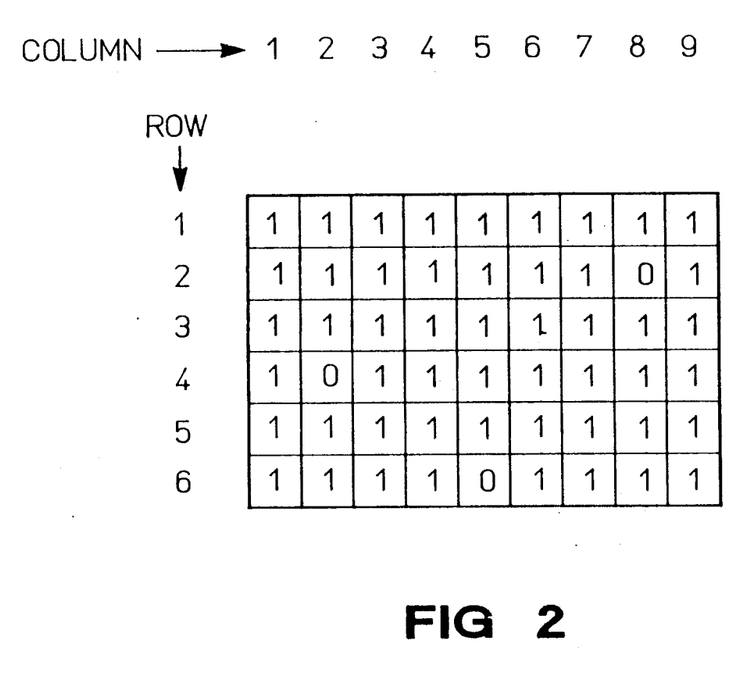
FIG. 2 illustrates the numbering convention used in the present invention to specify the row and column values corresponding to a given pixel.

For the purposes of this discussion, an image will be defined to be a two dimensional array of pixels, P(row, column). The row index runs from $r_1$ to $r_2$, there being n pixels in each row. Similarly, the column index runs from $c_1$ to $c_2$, there being m pixels in each column. The $P(i,j)=1$ for the points on an object in the image and O otherwise. The image is assumed to be embedded in a sea of Os. That is, $P(i,j)=O$ if $i<r_1$, $i>r_2$, $j<c_1$, or $j>c_2$. The row index increase from top to bottom, and the column index increase from left to right as shown in FIG. 2.

In the following discussion, it will often be necessary to compare the memory requirements or computational time requirements of different approaches for solving some problem. In this regard, the nomenclature Y requires O(x) time will be defined to mean that the time to perform operation Y is of order x. Here, the phrase "of order x" has its conventional mathematical meaning, i.e., $g(n)=O(f(n))$ implies that g(n) is less than or equal to cf(n) for all $n>N$ where N and c are constants.

Any rectangle can be denoted by a 4-tuple of the form [l,r,t,b], where l and r are the column index corresponding to the left and right sides of the rectangle, and t and b are the row indices corresponding to the top and bottom of the rectangle. In the case of a square, it follows from the above definition that $r>l$, $b>t$, and $r-l=b-t$. For the purposes of this discussion, a rectangle is defined to be filled if every pixel in the rectangle is a 1. However, it will be apparent to those skilled in the art that the role of "1" and "0" may be interchanged.

As noted above, a filled square is said to be maximal if it is not contained in any other filled square. The present invention utilizes four squares referred to as $sq_{nw}$, $sq_{ne}$, $sq_{sw}$, and $sq_{se}$ to determine whether a particular square is maximal. Given a square [l,r,t,b], these squares are defined as follows:

$sq_{nw} = [l-1,r,t-1,b]$, (northwest square)
$sq_{ne} = [l,r+1,t-1, b]$, northeast square)
$sq_{sw} = [l-1, r,t,b+1]$, (southwest square) and
$sq_{sw} = [l,r+1,t,b+1]$ (southeast square)

Figure 3A:
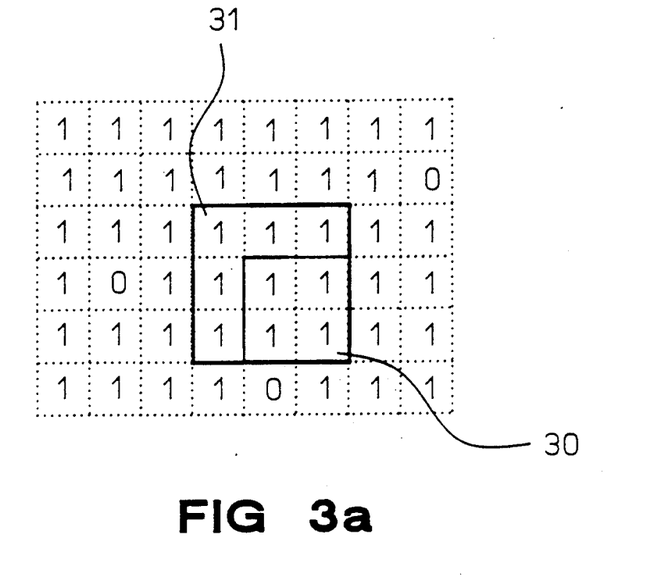
FIG. 3(a) illustrates the relationship of the $sq_{nw}$ square to a given square.
Figure 3B:
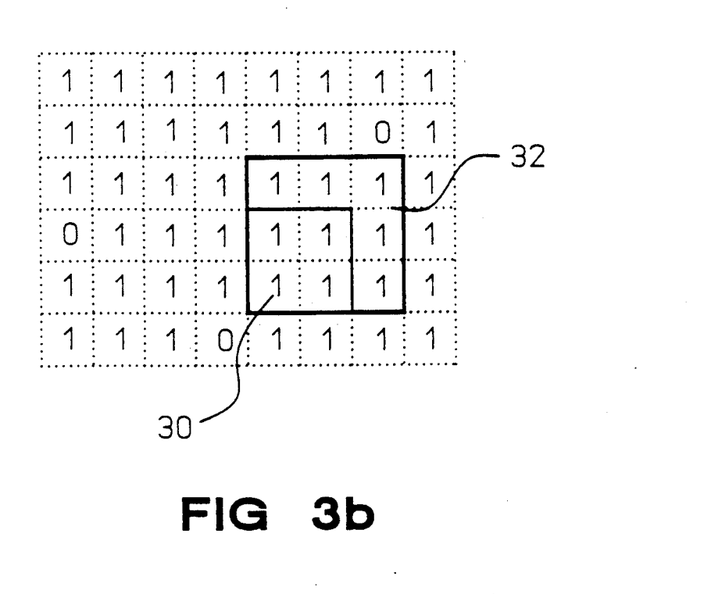
FIG. 3(b) illustrates the relationship of the $sq_{ne}$ to a given square.
Figure 3C:
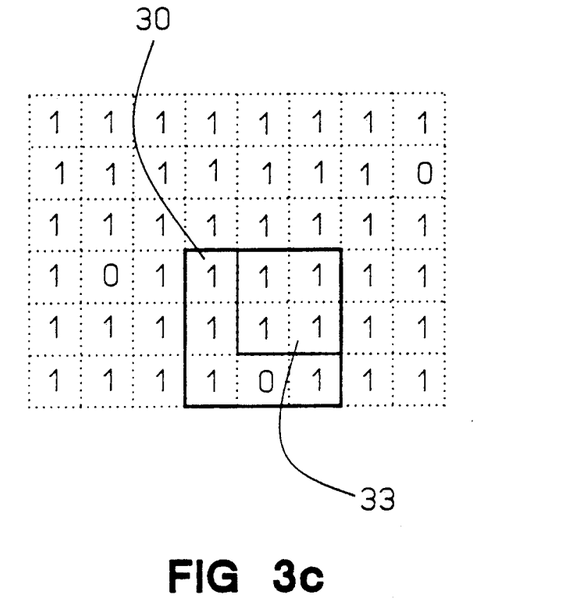
FIG. 3(c) illustrates the relationship of the $sq_{sw}$ square to a given square.
Figure 3D:
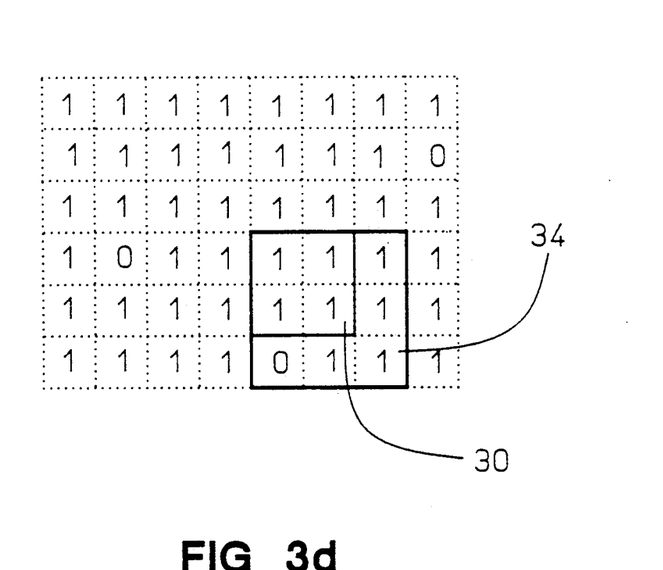
FIG. 3(d) illustrates the relationship of the $sq_{se}$ square to a given square.

FIGS. 3(a)-(d) illustrate a section of an image which includes a square 30. FIG. 3(a) shows the $sq_{nw}$ 31 corresponding to square 30. FIG. 3(b) shows the $sq_{ne}$ 32 corresponding to square 30. FIG. 3(c) shows the $sq_{sw}$ 33 corresponding to square 30, and FIG. 3(d) shows the $sq_{se}$ 34 corresponding to square 30.

The present invention utilizes the observation that a filled square is maximal if and only if $sq_{nw}$, $sq_{ne}$, $sq_{sw}$, and $sq_{se}$ are not filled squares. In the example shown in FIG. 3, $sq_{nw}$ is a filled square; hence square 30 is not maximal. As can be seen from FIG. 3, square 30 is contained within square 31.

Figure 4A:
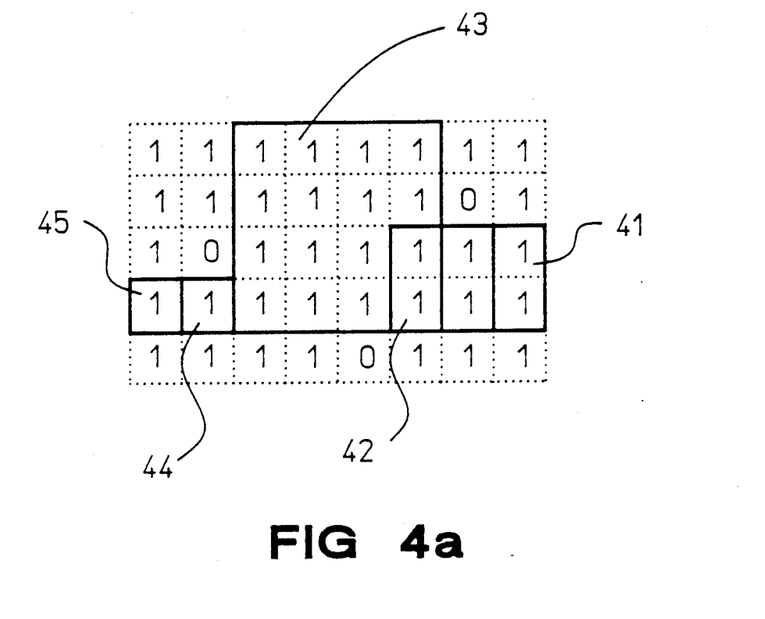
FIG. 4(a) shows the squares which do not have northern squares and which have their bottoms on a given row.
Figure 4B:
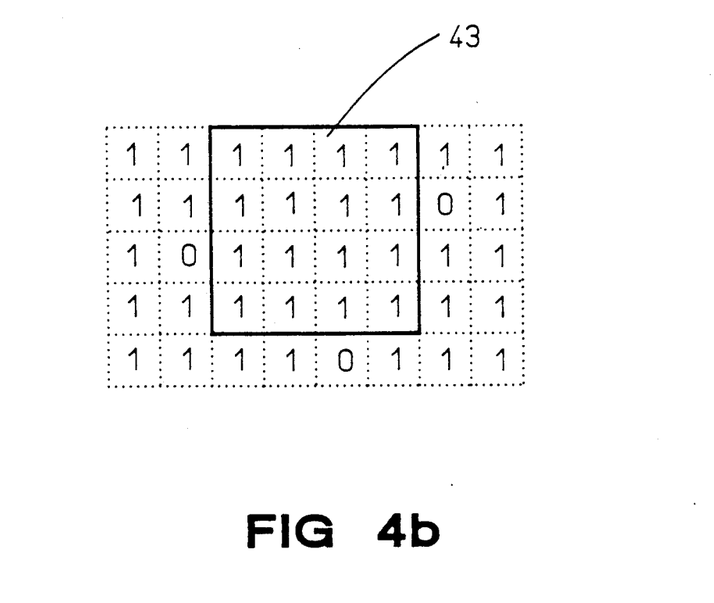
FIG. 4(b) shows the square from FIG. 4(a) which also does not have southern squares.

The method of the present invention can be viewed as comprising two steps which are performed on each row of the image. These steps are illustrated in FIG. 4(a) and (b), respectively. FIGS. 4(a)-(b) illustrate a section of an image. In the first step, the set, $S_{row}$ of all filled squares having a bottom row coordinate equal to the row in question and for which $sq_{nw}$ and $sq_{ne}$ are not filled squares is formed. In the example shown in FIG. 4(a), there are 5 such squares 41-45.

In the second step, those filled squares in $S_{row}$ for which $sq_{sw}$ and $sq_{se}$ are not filled squares are extracted. These squares correspond to the maximal squares having a bottom row coordinate on the row in question. There is only one such square in the example shown in FIG. 4(a)-(b), namely square 43 which is shown in FIG. 4(b).

Figure 5:
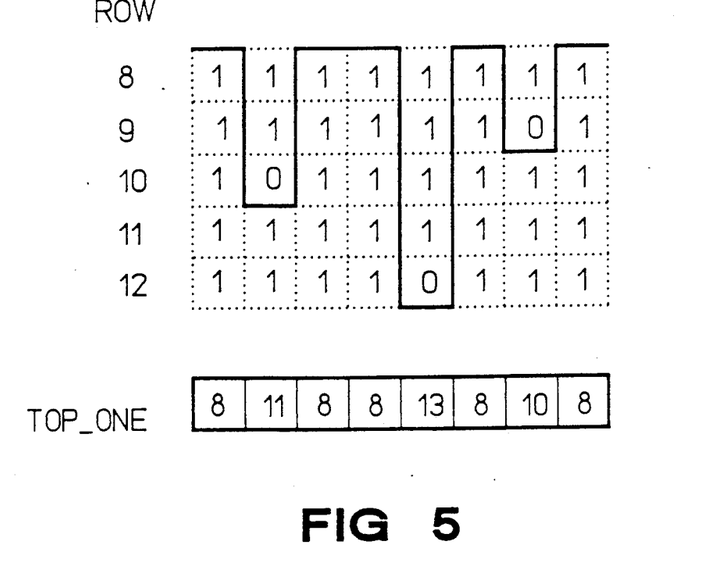
FIG. 5 illustrates a top_one array.

To minimize the computational complexity of performing these two steps, an array, referred to as top_one, is calculated for each row. Array top_one is computed for each row. This array is a function of the column number. Each entry in the top_one array is the row number of the last 1 encountered before encountering a 0 as one moves upward (i.e., decreasing row numbers) in the column in question. Alternatively, the top_one value is the row number +1 of the nearest 0 to the row in question between said row and the beginning of the column in question. An example of the top_one array for row 12 in the above example shown in FIGS. 4(a)-(b) is shown in FIG. 5. In calculating top_one for row r, it is assumed that all pixels in row r+1 are 0.

The top_one array is computed incrementally at each row using the top_one array computed for the preceding row. Assume that the top_one array for row 0 contains a 1 for each column. Then for column, c, in row r, top_one is equal to the value of top_one in row r−1 unless the pixel for row r, column c is 0. In that case, top_one for row, r, column, c, is set to r+1.

The top_one array is used to calculate the set, S, of all filled squares which have bottoms on the current row and for which $sw_{nw}$ and $sq_{ne}$ are not squares. In this regard, it is important to note that the rectangle [l,r,t,row] is filled if and only if $t \geq$ top_one[j] for all columns j where $l \geq j \geq r$. Hence the rectangle in question is filled if and only if $t \geq$ max_t, where max_t is the maximum of the top_one array for the row in question for columns l through r.

Before describing in more detail how the method of the present invention accomplishes the above described steps, an efficient algorithm for finding max_t will be discussed in detail. Consider an image consisting of rows $r_1$ through $r_2$ and columns $c_1$ through $c_2$. Let the values of the two indices, l and r, be $c_1$ initially. Now consider a sequence of operations $[o_1, o_2, \ldots o_k]$ performed on l and r. There are two possible operations, denoted by increment_l and increment_r. The operation increment_l increases the current value of l by 1, and increment_r increases the current value of r by 1. However, none of these operations will increase l if $l \geq r$, thereby ensuring that $l \leq r$ at all times. The sequence of operations terminates when r is set to $c_2 + 1$. The problem is to provide the value of max_t quickly after each operation. The goal is to maintain a data structure such that the maximum value of top_one between l and r is available in constant time after any such operation.

One prior art approach to this problem utilizes a single integer variable, max_t. After each operation in which l and/or r is incremented, every element of top_one between l and r is examined and the maximum stored in max_t. Since there may be n values between l and r, there are O(n) operations to provide one updating of max_t. In a given row, n updates are needed. Hence, this approach requires $O(n^2)$ in time and O(1) memory space for each row. As a result, the time to extract all of the maximal squares from the image is $O(mn^2)$.

Figure 6:
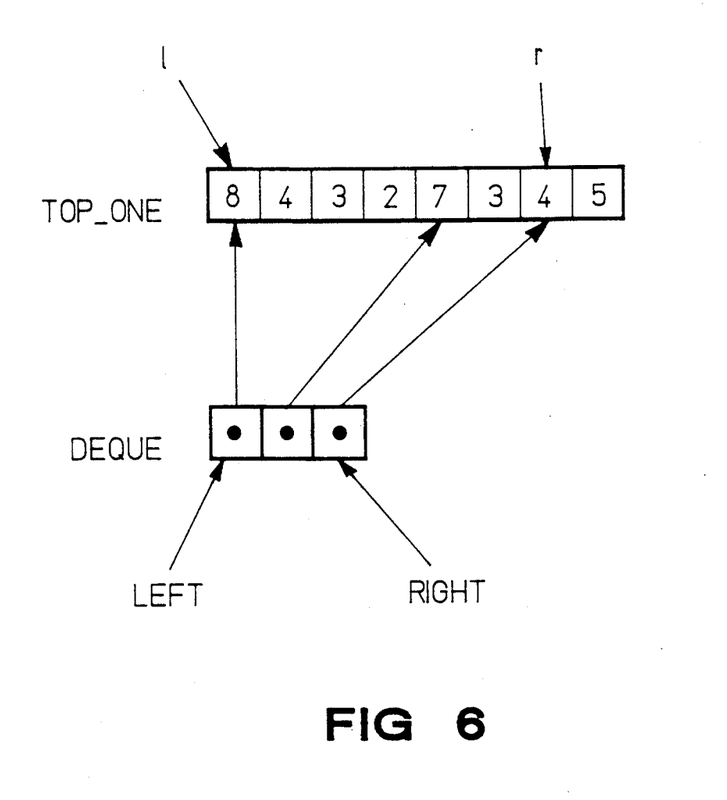
FIG. 6 illustrates the relationship of the top_one array to the deque array.

The present invention provides a significant improvement in the time required to maintain the data structure. The present invention utilizes a one-dimensional data structure referred to as deque[i], where i runs between two values, left and right. Each entry in the deque array points to a location in the top_one array. The method used to update deque requires a constant amortized time. After updating, deque[left] will be the index of the maximum value of top_one between l and r, i.e., max_t = top_one[deque[left]]. And, deque[i] will contain the index of the maximum value of max_t between deque[i−1] and r. For clarity, an exemplary top_one array and the locations to which the individual elements of deque array point are shown in FIG. 6.

Figure 7A:
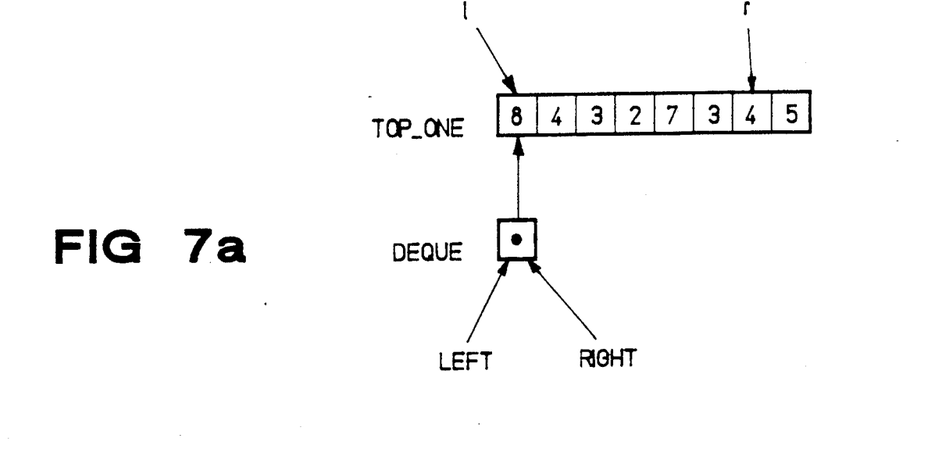
FIG. 7(a) illustrates the manner in which the deque array is initialized.
Figure 7B:
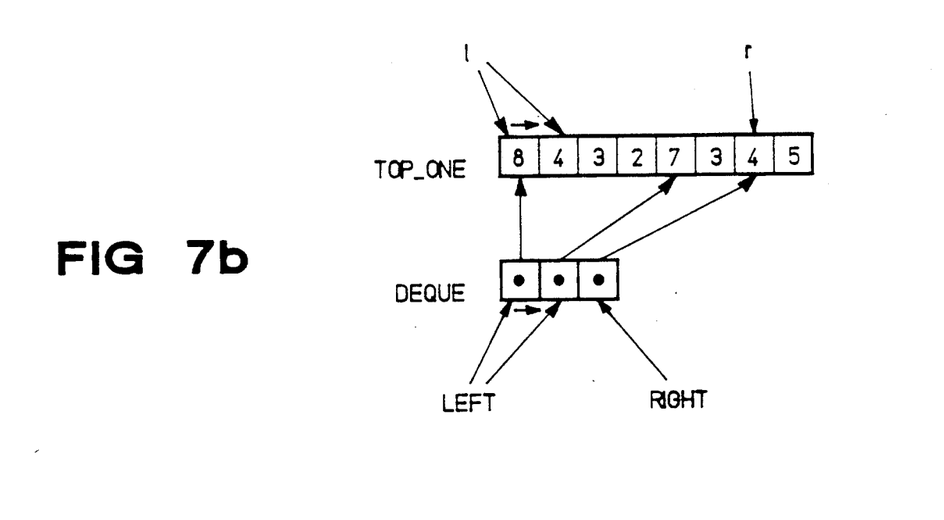
FIG. 7(b) illustrates the manner in which the deque array is updated in response to incrementing the l index.

The manner in which the deque array is updated will now be explained with the aid of FIGS. 7(a)-(c). Initially, the column indices l and r are set to $c_1$, the indices left and right are set to 0, and deque[right] is set to r as shown in FIG. 7(a). Referring to FIG. 7(b), if l is incremented, left is also incremented if l > deque[left].

Figure 7C:
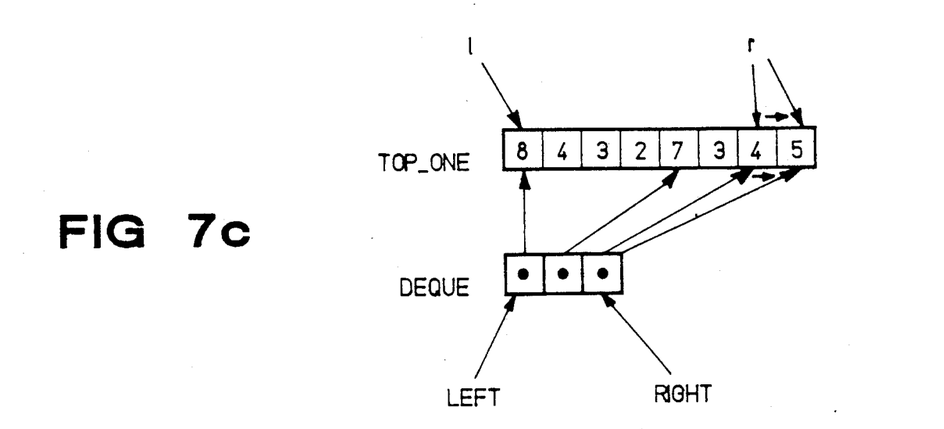
FIG. 7(c) illustrates the manner in which the deque array is updated in response to incrementing the r index.

The situation is somewhat more complicated in the case in which r is incremented. Referring to FIG. 7(c), right is first decremented if necessary. Index right is to be decremented as long as left ≤ right and top_one[r] ≥ top_one[deque[right]]. After any decrementation of right has been completed, right is incremented by one and deque[right] set to r.

The variable l can be incremented to any desired value by a sufficient number of calls to increment_l. However, the following additional operations can be executed more quickly. Let l be incremented by an amount greater than 1, but only if doing so maintains $l \leq r$. Then l can be set to the larger amount directly thus saving the testing after each increment by one in the increment_l algorithm. Then left is incremented until deque[left] ≥ l. This algorithm will be referred to as increment_l_upto(l'). Consider the case in which l is incremented right up to r, or it is known that r is the index of the maximum value of top_one between l and r. In this case, left can be replaced directly by right in the procedure for incrementing l and also in the procedure for incrementing r instead of decrementing right by one as long as left ≤ right and top_one[r] ≥ top_one[deque[right]]. These procedures will be referred to as increment_l_upto_r and new_max_t in the following discussion.

It can be shown that the time needed to update deque for all the operations in a row is O(n). The memory space needed is clearly O(n) also, since deque could require n values. Hence, the method of the present invention requires a time O(mn) to extract all of the maximal squares from the image. This is significantly better than the prior art method described above which required $O(mn^2)$.

Figure 8:
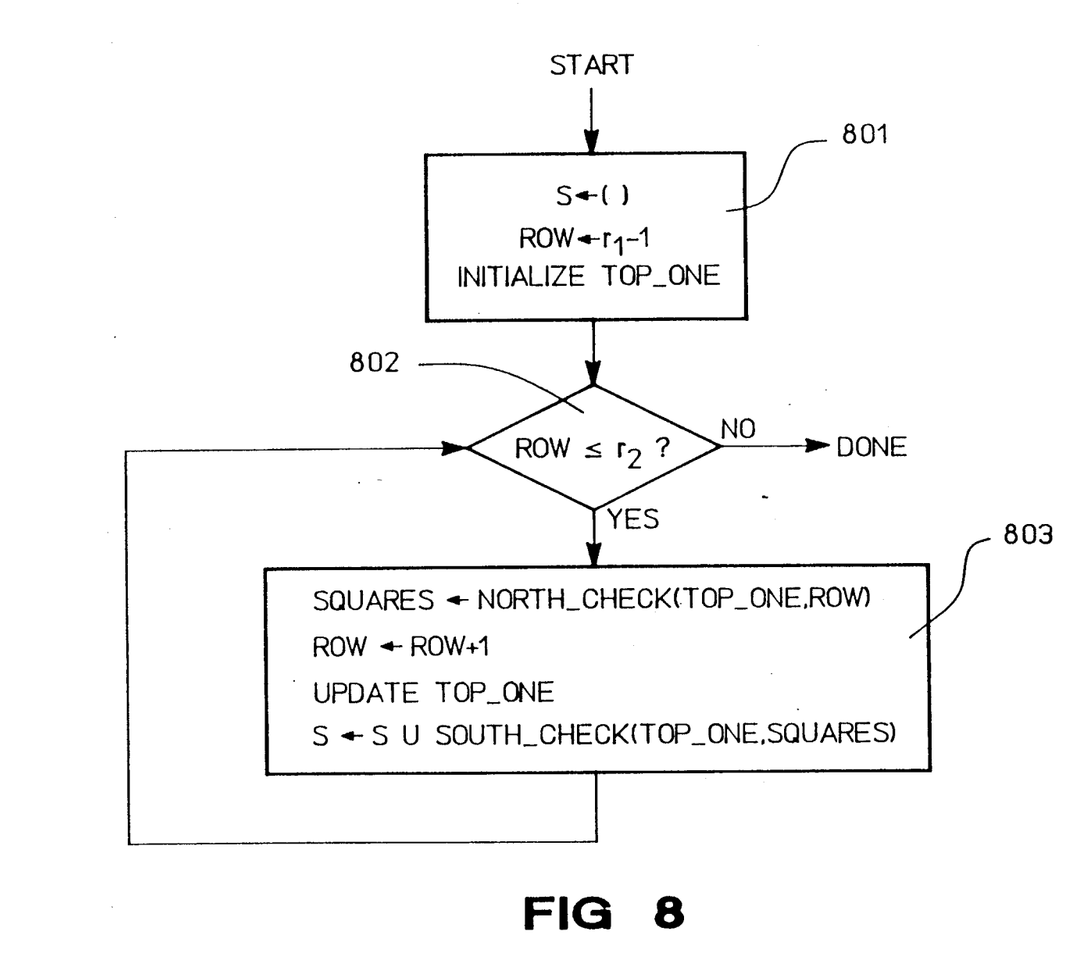
FIG. 8 is a flow chart of the basic method of the present invention.

Given the above background, a more detailed description of the method of the present invention will now be provided. A flow chart of the basic algorithm is shown in FIG. 8. The set of maximal squares, S, is initially set to be the empty set as shown at 801. The row index is set to $r_1 - 1$ and the top_one array is initialized. The image is scanned one row at a time from top to bottom. As each row is scanned, a list of filled squares having their bottom on the current row and which do not have northern squares is computed using top_one for the current row. This is performed by a function which is referred to as north_check. This function will be described in more detail below. The row index is then incremented as shown at 803, and top_one is updated again. The list of squares returned by north_check is then searched, accepting as maximal those squares which do not have southern squares. This is performed by a function referred to as south_check. This function will also be discussed in more detail below. The algorithm continues until the row index is incremented past the last row of the image as shown at 802.

The algorithm that checks for the northern squares makes use of the following observation. Assume that a row is given. Define $sq_{col}$ to be the set of filled squares having bottoms on row, right corners at col and for which $sq_{nw}$ is not a filled square. Further define $s_{col}$, for col ≥ $c_1$, to be the union of $s_{col-1}$ and the set of all squares in $sq_{col-1}$ for which $sq_{ne}$ is not a filled square. For col<$c_1$, $s_{col}$ is defined to be the empty set. It will be apparent to those skilled in the art that north_check[-row] is $s_{col}$ for col=$c_2$+1. The procedure north_check makes use of the observation that the set $sq_{col}$ contains at most one square.

Figure 9:
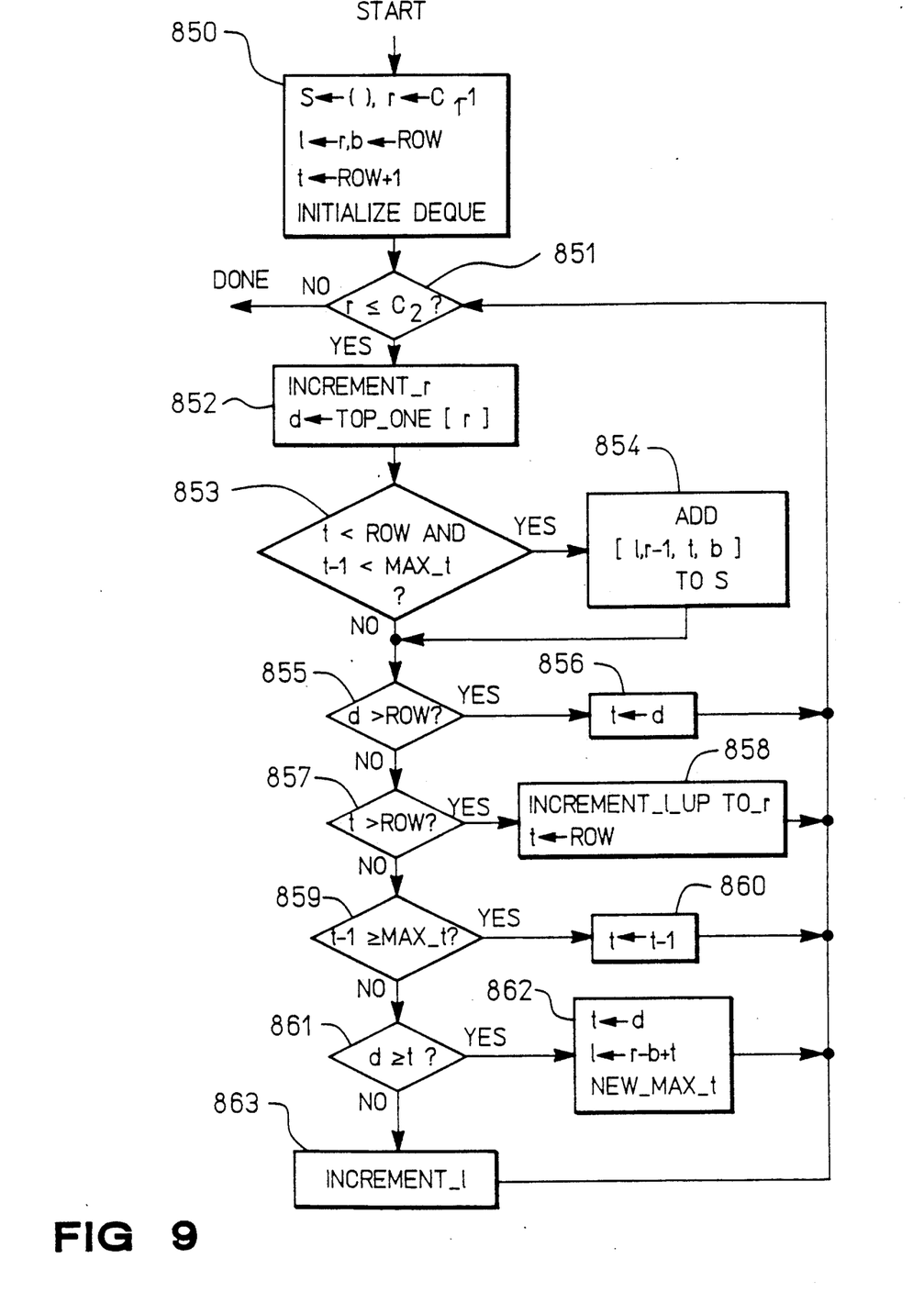
FIG. 9 is a flow chart of the north_check algorithm shown in FIG. 8.

A flow chart for the function north_check is given in FIG. 9. The function starts by initializing the variables as shown at 850. S is the output set and is initialized to the empty set. Variable r and l are used to keep track of the right and left corners of a potential square. Variables t and b are used to keep track of the top and bottom of the potential square.

The portion of the algorithm shown at 852-863 is repeated for each row in the image. Box 851 tests for completion of the algorithm. Box 852 sets up the parameters of each candidate square.

If t≤row and t−1<max_t then $sq_{ne}$ is not filled and the square is to be included in the north_check list. This is shown at 853-854. Having tested the candidate square, the algorithm updates t and l to values which will cause the output of box 852 to be the next possible candidate. Boxes 855-856 deal with the case in which $sq_{col}$ is empty. Boxes 857-858 deal with the case in which $sq_{col-1}$ is empty. Box 859-860 deal with case in which $sq_{ne}$ is a filled square. Boxes 861-862 deal with the case in which the new candidate square is smaller than the maximum square in $sq_{col-1}$. Box 863 deals with the remaining case.

The procedure increment_l increases the value of l by one. The procedure increment_l_upto_r increases l to r. These procedures are carried out as described above with reference to FIG. 7. These procedures also increment the deque array so that max_t is always available. Similarly, the procedure increment_r is carried out as described above with reference to FIG. 7.

Figure 10:
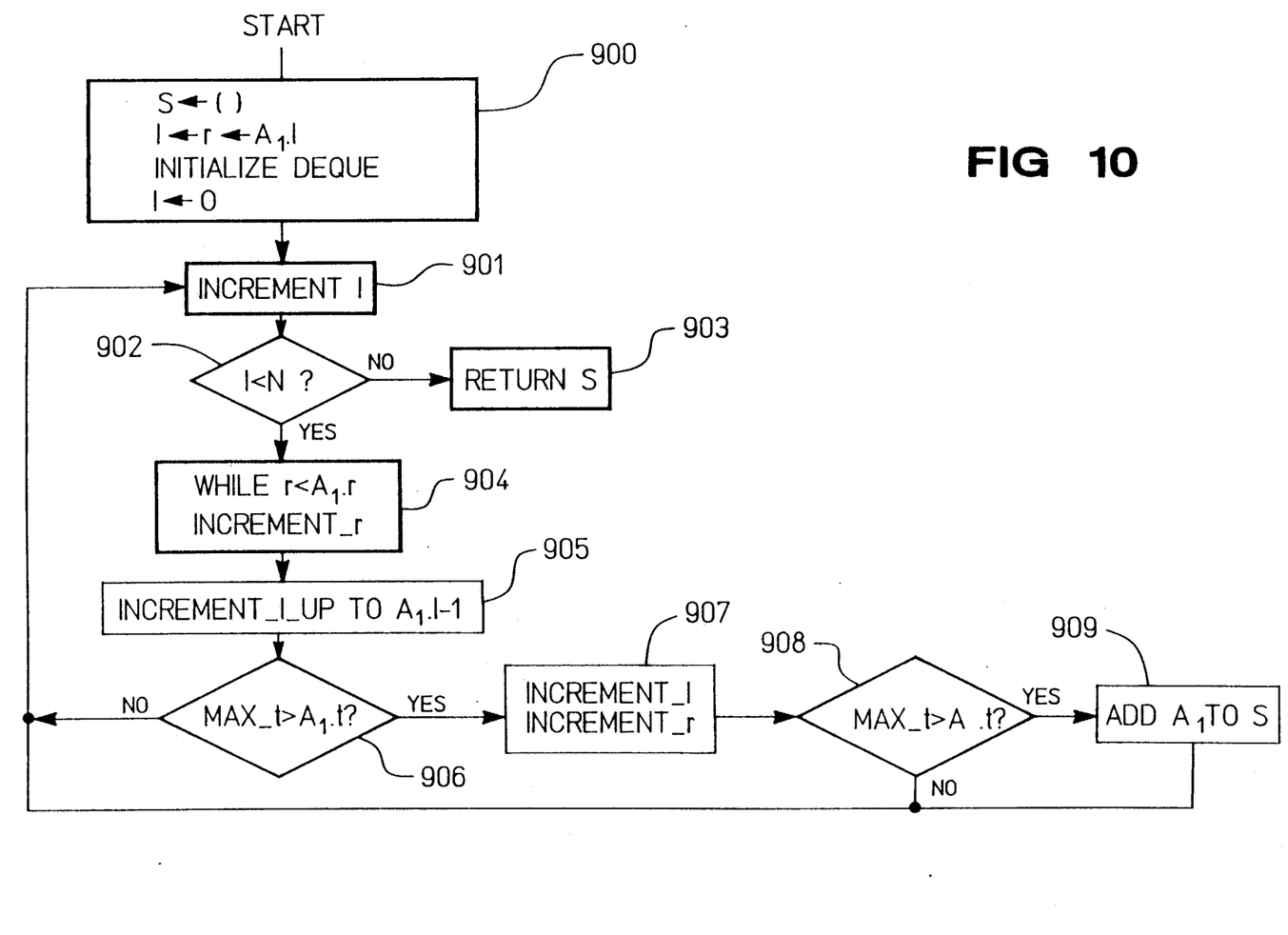
FIG. 10 is a flow chart of the south_check algorithm shown in FIG. 8.

The manner in which the method of the present invention tests the squares outputted by north_check for those that lack southern squares is shown in FIG. 10 which is a flow chart of the south_algorithm. This algorithm makes use of the fact that the set of squares, {$A_i$} returned by north_check is inherently ordered from left to right. The algorithm starts by initializing the various variables as shown at 900. Each square is then examined to determine if it has a southern square. Blocks 901 and 902 provide the incrementing and testing needed to cause the remaining code to examine each square. When all squares have been examined, the set, S, is returned as shown at 903.

For each square, r is incremented as shown at 904 until it coincides with the right corner of the square. The variable l is then incremented as shown at 905 until it is equal to left corner of the square less one, i.e., the left corner of the southwest square. The algorithm then tests for a filled southwest square as shown at 906. If the southwest square is not filled, l and r are incremented as shown at 907 to coincide with the southeast square. The southeast square is then tested as shown at 908. If the southeast square is not filled, the square is added to the output set, S.

Accordingly, there has been described herein a novel method for finding the set of all maximal squares in an image. The method is preferably practiced in conjunction with a conventional digital computer; however, special purpose computing hardware or other data processing equipment may also be used.

The above described method utilizes an array top_one in which the ith value is value of the row number+1 of the pixel having a value of 0 which is between the beginning of the ith column and the row in question and which is nearest to the row in the ith column. However, it will be apparent to those skilled in the art that other definitions could be used without departing from the method taught in the present invention. For example, the present invention could be defined in terms of an array bottom_one in which bottom_one[i]=-top_one[i]−1. In this case, all references to top_one[i] in the above discussion would be replaced by bottom_one[i] plus or minus 1 depending on the reference in question. Also, some of the incrementing or decrementing operations would need to be modified with this new definition. The important feature of the top_one array array in the present invention lies in the ability to calculate the location of the last 1 in a column as one moves from the current row to the beginning of the column.

The method of the present invention has been described in terms of a two-dimensional array of pixel which is derived from an image by some form of mapping of the image. It will be apparent to those skilled in the art that the mapping could be incorporated in the present invention, thereby removing the need to calculate a separate array. For example, a filled square could be defined as a square in the image in which each pixel has a value greater than a predetermined threshold value.

Various modifications to the present invention will become apparent to those skilled in the art from the foregoing description and accompanying drawings. Accordingly, the present invention is to be limited solely by the scope of the following claims.

What is claimed is:

1. In conjunction with a data processing system including a memory, a method for finding maximal squares in a two-dimensional array of pixels, each said pixel having either a value of one or zero, said two-dimensional array comprising a plurality of sequentially numbered rows and a plurality of sequentially numbered columns, said method comprising sequentially processing the rows of said two-dimensional array, said procesing of each row comprising the steps of:

defining a list S identifying squares, said list being empty at the start of the processing of said row;

adding to S those squares having bottoms on said row for which the northeast and northwest squares are not filled; and examining the next row of said two-dimensional array to determine the squares in S which squares have southeast and southwest squares that are not filled.

2. The method of claim 1 wherein said examining step comprises:

constructing an array, top_one, for said row, said top_one array having entries, top_one(i), for i running from 1 to the number of columns in said two-dimensional array, the ith entry being related to the value of the row number of the pixel having a value of 0 which is between the beginning of the ith column and said row and which is nearest to said row in said ith column.

3. In conjunction with a data processing system including a memory, a method for finding maximal squares in a two-dimensional array of pixels, each said pixel having either a value of one or zero, said two-dimensional array comprising a plurality of sequentially numbered rows and a plurality of sequentially numbered columns, said method comprising the steps of:

storing one row of said two-dimensional array in said data processing system; and constructing a list of all filled squares having bottoms on said stored row for which the northwest, northeast southwest and southeast squares are not filled squares, said list being stored in said memory of said data processing system, wherein said list constructing step comprises the steps of:

constructing an array, top_one, for said row, said top_one array being stored in said memory of said data processing system and having entries, top_one(i), for i running from 1 to the number of columns in said two-dimensional array, the ith entry being related to the value of the row number of the pixel having a value of 0 which is between the beginning of the ith column and said row and which is nearest to said row in said ith column, and defining two column numbers l and r such that $l \leq r$; and constructing an array, deque(j), wherein deque(l) is the value of j for which top_one(j) is maximum for j values from l through r, and deque(i) is the j value(j) for which top_one is maximum for j values between deque(i-1) and r, said array deque(j) being stored in the memory of said data processing system.

4. The method of claim 3 wherein said list constructing step further comprises constructing said top_one array for the row after said row.

* * * * *